United States Patent
Nagarathnam (10) Patent No.: US 11,681,515 B2
(45) Date of Patent: Jun. 20, 2023

(54) METHOD OF DELIVERING AND UPDATING SOFTWARE ON PERIPHERAL DEVICES CONNECTED TO SET-TOP BOXES, IOT-HUBS, OR GATEWAYS

(71) Applicant: ARRIS Enterprises LLC, Suwanee, GA (US)

(72) Inventor: Yuvaraj Nagarathnam, Karnataka (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/246,895

(22) Filed: May 3, 2021

(65) Prior Publication Data

US 2021/0405993 A1 Dec. 30, 2021

Related U.S. Application Data

(60) Provisional application No. 63/046,575, filed on Jun. 30, 2020.

(51) Int. Cl.
| | |
|---|---|
| *G06F 8/65* | (2018.01) |
| *H04L 67/00* | (2022.01) |
| *H04L 9/40* | (2022.01) |
| *G06F 21/44* | (2013.01) |

(52) U.S. Cl.
CPC ............. *G06F 8/65* (2013.01); *G06F 21/44* (2013.01); *H04L 63/0428* (2013.01); *H04L 63/101* (2013.01); *H04L 67/34* (2013.01)

(58) Field of Classification Search
CPC . H04L 63/0428; H04L 63/101; H04L 63/123; H04L 67/34; G06F 8/65; G06F 21/44
See application file for complete search history.

(56) References Cited

U.S. PATENT DOCUMENTS

| | | | | |
|---|---|---|---|---|
| 6,930,598 | B2* | 8/2005 | Weiss | H04L 69/329 370/242 |
| 7,673,297 | B1* | 3/2010 | Arsenault | H04N 21/42692 717/172 |
| 7,765,280 | B2 | 7/2010 | Akins | |
| 10,182,304 | B2* | 1/2019 | Vyas | G06F 8/654 |
| 2001/0013121 | A1* | 8/2001 | Kimball | H04N 21/4627 348/E7.063 |
| 2004/0088180 | A1* | 5/2004 | Akins | H04N 21/818 348/E7.071 |

(Continued)

*Primary Examiner* — Marina Lee
(74) *Attorney, Agent, or Firm* — Panitch Schwarze Belisario & Nadel LLC (57) ABSTRACT

Disclosed are an apparatus and method for securely delivering and updating software on a peripheral device in an area network. Software for a peripheral device is obtained from an entity responsible for the functionality of the peripheral device. The software is validated for functionality and integrity, and it is then encrypted at the headend of a network infrastructure which securely delivers the software to a processor responsible for controlling the interface of the area network. The processor decrypts the validated software, and it delivers the validated software to a peripheral device on the area network. The validated software is executed on the peripheral device, such that the peripheral device executes an authentic version of the software from the entity responsible for the functionality of the peripheral device.

20 Claims, 7 Drawing Sheets

(56) References Cited

U.S. PATENT DOCUMENTS

| | | | |
|---|---|---|---|
| 2005/0039025 A1* | 2/2005 | Main | H04N 21/6543 |
| | | | 348/E5.006 |
| 2009/0235244 A1* | 9/2009 | Enomori | H04L 12/2814 |
| | | | 717/170 |
| 2019/0138295 A1* | 5/2019 | Agerstam | H04L 12/66 |
| 2020/0167148 A1* | 5/2020 | Park | G06F 8/65 |
| 2021/0326331 A1* | 10/2021 | Shin | G06F 8/65 |

* cited by examiner

METHOD OF DELIVERING AND UPDATING SOFTWARE ON PERIPHERAL DEVICES CONNECTED TO SET-TOP BOXES, IOT-HUBS, OR GATEWAYS

FIELD

The present invention relates generally to a method and apparatus for delivering and updating software on peripheral devices connected to a headend infrastructure such as a set-top box ("STB"), an Internet of Things ("IoT") hub, or a gateway, and more particularly to automatically and securely providing software updates to peripheral devices in an area network such as a local area network ("LAN") and/or a personal area network ("PAN").

BACKGROUND

Cable service providers, which are also referred to as Multiple System Operators ("MSO"), use community access television ("CATV") network infrastructure for transmitting television content signals and video on demand ("VoD") signals. They also provide broadband data services which typically include Internet access using the Data Over Cable Service Interface Specification ("DOCSIS") protocol. To provide television and data services, a MSO typically uses a Cable Modem Termination System ("CMTS") for the data services and a quadrature amplitude modulation ("QAM") multiplexer for downstream broadcast television, narrow cast and VoD traffic signals. These devices may be located at one or more hubs, which are typically connected to a head end via a network according to a networking protocol, such as Ethernet or SONET. A residential cable customer is typically connected to the CMTS and hub via a cable modem and a wireless router that may be combined in a single box which is called a gateway. In order to view video content that is transmitted through the cable modem or gateway, residential customers connect their televisions to a STB. Since STBs have recently gained additional features and functionality, they are often referred to as a smart media device ("SMD") and can be considered as the network interface controller for their peripheral devices.

As STBs evolve into smart media devices, it is becoming possible for residential customers to interface with the STB using gesture remotes, Bluetooth ("BT") voice remote controllers, sound bars, far field microphones, or other peripheral devices. These peripheral devices can either be bundled and sold with the STB (as is the case with BT remotes) or can be bought off the shelf (as is the case with sound-bars). As these devices are expected to work with each other, their interoperability must be checked and usually this is done as part of a "plug fest" or internal interoperability testing by the STB vendor or the peripheral device vendor.

During this testing, if a device does not work as expected with the STB, there are two possibilities. The first possibility is that the bug or interoperability problem is caused by the STB or its software, and if this is the case, then the STB manufacturer must provide a software upgrade to fix the issue. Such a situation may occur when a new TV is introduced into the market, and the STB is discovered to be incompatible with the new TV. The second possibility is when the incompatibility is the result of the software provided by a peripheral device vendor. In this case, the peripheral device vendor will be asked to fix the bug. When a customer complains of an interoperability caused by a peripheral device from a different vendor, the customer is informed of the interoperability issue and asked to contact the peripheral device vendor for a software update or fix.

The software for a Remote Control Unit ("RCU") is an example of peripheral device software that can be troublesome to update. Updating RCU software typically requires the person performing the update to connect the RCU to a USB/debug port, which cannot be done by an end user/customer who is not sufficiently trained. After an RCU is deployed to an end user, there may be critical updates which are needed for the RCU. This is especially true for an RCU that is used for voice control and/or gesture control that need subsequent updates. An end-user who is not sufficiently trained may not update the RCU with these critical updates, thus leaving the device lacking, such as from a security or feature update. If the interoperability issue is discovered before the STB is deployed, the STB cannot be deployed until all the issues with the RCU are resolved. Accordingly, an interoperability issue involving a RCU can delay the deployment of the STB, and this can lead to a delay in a product launch for the STB. As more and more peripheral devices are expected to work with a STB/Gateway, the risk of such delays increases, thus impacting time to market. By deferring some of the features of the peripherals for later release, this problem can be addressed but there is difficulty with updating the peripheral software after deployment, as mentioned above.

In a known system of the type described in U.S. Pat. No. 7,765,280, entitled "Downloadable Remotely Stored Device Drivers for Communication with Set-Top Box Peripherals," a method is disclosed for updating a peripheral device, such as a personal audio device, which is connected to a STB. The method requires the STB to retrieve a device driver from a remote server and to store the device driver in a memory associated with the STB. The user of the personal audio device is able to transfer the device driver from the STB to the personal audio device, and then the user can update the personal audio device.

In another known system of the type described in U.S. Pat. No. 10,182,304, entitled "Updating Firmware of IOT Devices," a method is disclosed in which an access point ("AP") of a wireless network receives registration requests for a firmware update from a set of Internet of Things (IoT) devices. The AP determines availability of the firmware update at a remote server, and upon determining the availability, downloads the firmware update from the remote server into to a non-volatile storage, and provides the firmware update to the IoT devices.

Known systems for updating the software of peripheral devices connected to a STB, IoT hub, or gateway, tend to require the user's involvement in the updating process, or to create a security issue, since peripheral devices typically do not include trusted chipsets which can be relatively expensive compared to the cost of the peripheral devices. Accordingly, there is a need for a method that can easily, inexpensively and securely update the software of peripheral devices connected to a STB, IoT hub, or gateway.

SUMMARY

Disclosed is a method and apparatus in which a head-end infrastructure such as a STB, IoT-hub, or gateway is used as a secure entry-point into an area network such as a LAN, PAN or other home network for delivering software updates to their respective peripheral devices. These peripheral devices typically include such devices as microphones, TV's and smart TV's, IoT sensors, remote controls, game controllers, sound bars, etc. STB's have been traditionally known to implement secure chipsets and have infrastructure to deliver software updates securely from the headend to the home STB. This service can be extended to peripheral devices connected to a STB, and it is especially helpful for updating peripheral devices that cannot directly connect to the Internet. It is also helpful for updating devices such as IoT devices and sensors which may otherwise not be connected to the Internet via a secure or trusted chipset.

The disclosed method and hardware are applicable to any suitable electronic device, referenced here as head-end infrastructure, that can connect to a peripheral, e.g. a media device like a TV, which can download software or firmware for an RCU and deliver it to the RCU using the method and system disclosed herein, depending on configuration.

DETAILED DESCRIPTION OF THE EXEMPLARY EMBODIMENTS AND METHODS

Figure 1:
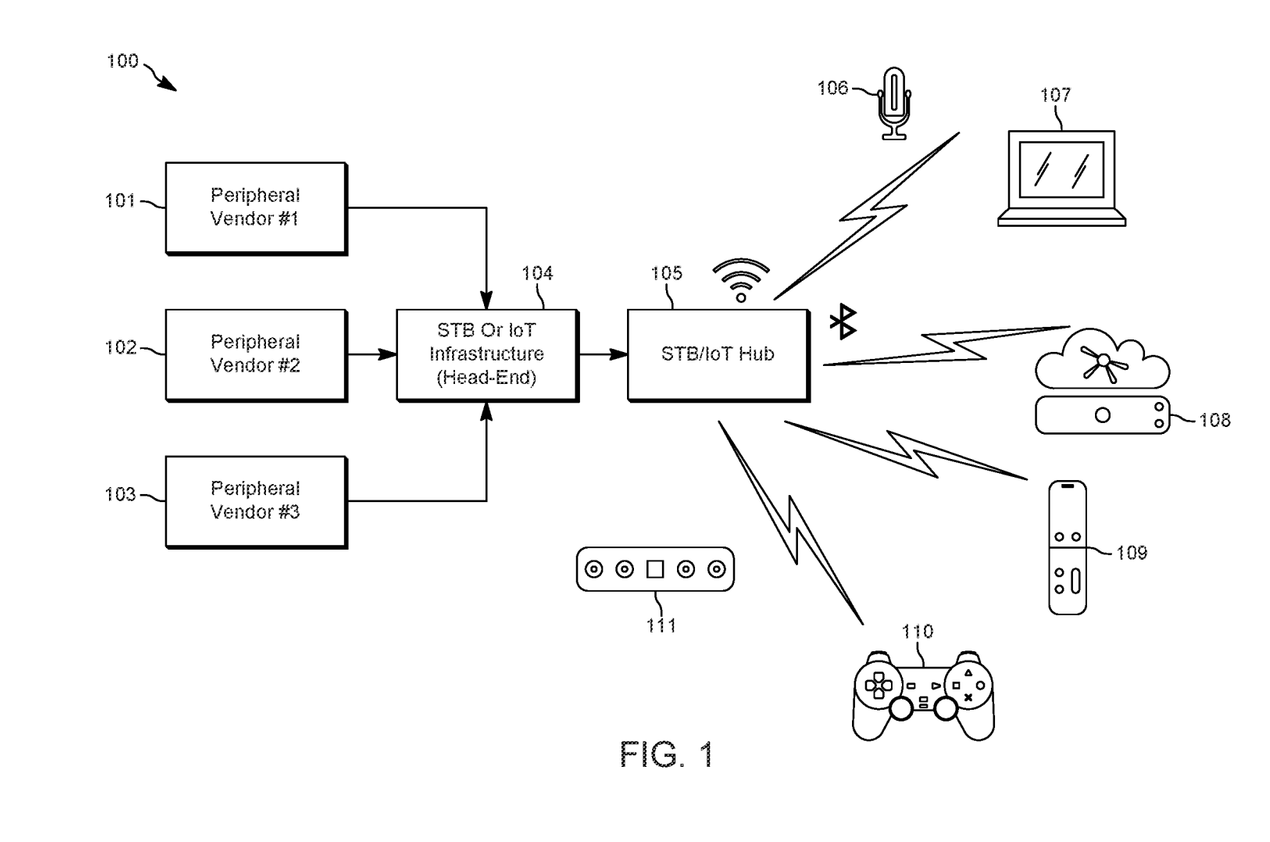
FIG. 1 is a diagram that illustrates a network having a plurality of peripheral devices that may need software updates from a peripheral device vendor.

Referring now to FIG. 1, a diagram illustrates a network 100 having a plurality of peripheral devices that may need software updates from peripheral vendors 101, 102, and 103. These peripheral devices could include a microphone 106, a smart TV 107, an IoT sensor 108, a RCU 109, a game controller 110, or a sound bar 111. These devices can be connected by following one of the network topology methodologies such as ring, star, mesh, tree, bus, hybrids thereof, etc. These peripheral devices can be connected either directly or indirectly to the Internet through a STB or IoT-hub 104 or other head-end infrastructure 104. In other words, the peripheral devices can be categorized either as 1) a peripheral device which can connect to the internet independently, or 2) a peripheral device which cannot connect to the internet. Peripheral devices such as a mouse, keyboard, microphone, RCU, etc. must be connected to a computer or other electronic device such as a STB and cannot be directly connected to the Internet. However, peripheral devices, such as a smart TV, tablets, smartphones, sound-bars, or wearable computing devices are considered peripheral devices that can connect to the Internet independently, since they can be connected and used on a computer system, and they can also run independently of the computer system, unlike a computer mouse or keyboard.

Peripheral devices that can connect to the Internet have provisions for updating their software, through software upgrade methodologies provided by the peripheral device vendor. Delivery of software to these peripheral devices may be unsecure and may compromise the peripheral device and the user's privacy. There is also the issue of interoperability with other devices in the network. For examples, a smart-TV after upgrading the software or firmware independently from the Internet, may stop working with the STB. IoT end points may not have a reliable connection to the Internet leading to longer or failed updates. IoT end points which can update software from the Internet need secure chips to prevent malware from being downloaded when updating the software. Secure chips increase the price of IoT infrastructure and IoT end-point devices, which are often relatively inexpensive devices or sensors. Devices that cannot connect to the Internet are left with no choice but to update their software or firmware manually, which is cumbersome. For example, a software upgrade of a sound-bar is usually done by downloading the new software to a USB mass storage device and connecting it to the sound bar to update the software. The end user who is not sufficiently trained will often avoid updating the software, which leads to security risks and/or functionality deficiencies. Accordingly, it can be appreciated that 1) peripheral devices connected to a STB or an IoT-hub or another electronic device using peripheral devices often do not have a way to update their software easily, and 2) secure delivery of software updates to IoT end points directly would require the IoT end points to have secure chipsets which would be relatively expensive.

Referring again to FIG. 1, in the method and apparatus disclosed herein, the STB or IoT-hub 105 is used as a secure entry-point into the home or user premises for delivering software updates to their respective peripheral device 106 to 111. STB's and gateways have been traditionally known to implement secure chipsets and have infrastructure to deliver software updates securely from the headend 104 to the home STB 105. This service can be extended to peripheral device 106 to 111 connected to a STB 105. FIG. 1, shows the flow of the "software update" from the peripheral device vendors 101, 102, 103 to the peripheral devices 106 to 111.

Figure 2:
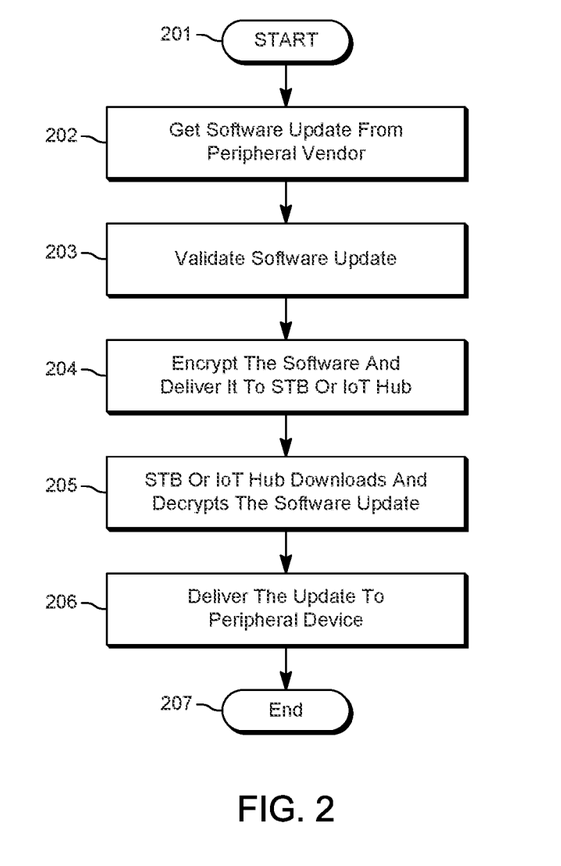
FIG. 2 is a flow diagram of the steps involved in delivery of the software from the peripheral device vendor to the peripheral devices.

Referring now to FIG. 2, a flow diagram shows the steps involved in the delivery of the software to the peripheral devices 106 to 111. The process is initiated in step 201, and in step 202, the peripheral device vendors 101, 102, 103 deliver the software updates to the owner of the STB vendor or IoT infrastructure 104. Upon receiving the software, the interoperability of the software is validated in step 203. In step 204, if a decision is made that the software is fit for download, 1) the software-update is sent as a carousel for traditional broadcast STB's 105, updating the appropriate Program Specific Information ("PSI") tables; or 2) the manifest file for the software download is set in a multicast server and the IP capable STB or IoT-hub 105 pulls the "software update" using https, FTP or TFTP or other suitable network protocol; or 3) the software update is delivered through another secure software delivery method. In step 204, the software to be delivered is also encrypted. In step 205, the STB or the IoT-hub 105 downloads and decrypts the software update with its secure chip, and checks the integrity of the software update using a Cyclic Redundancy Check ("CRC") which is an error-detecting code commonly used in digital networks and storage devices to detect accidental changes to raw data. In step 206, the peripheral device is contacted, and the update is delivered to the peripheral device. The peripheral device receives the update from the IoT-hub or STB 105 and updates its software image. The IoT-hub or STB 105 can use wired or wireless communication technologies to communicate with the peripheral device 106 to 111. These devices can be connected by following one of the network methodologies such as ring, star, mesh, tree, bus, hybrids thereof, etc. IoT-hub or STB 105 preferably implements a method of differentiating the software-update to various peripheral devices using a 'vendor id' flag. The STB 105 maintains the list of peripheral devices it is connected to and downloads "software update" only if the "software-update" is addressed to a peripheral device connected to the STB 105.

The method and apparatus disclosed herein provides several advantages over known methods. A first potential advantage is that concern over updating the software of peripheral devices is minimized or eliminated. A second potential advantage is that there are cost savings by delivering a software update rather than replacing the device simply because it has obsolete or infected software. A third potential advantage is that it improves or speeds up the time to market by permitting an early deployment with "must to have" features, and perhaps then later scheduling "nice to have" features as part of a software update. A fourth potential advantage is that it provides a way to update software on IoT endpoints and thus reducing the risk of security threats. A fifth potential advantage is that, by verifying the interoperability of the software in the infrastructure, risk of interoperability issues after a software update is reduced. A sixth potential advantage is that there is a cost advantage by making peripheral devices without a need for having secure processors.

Computer System Architecture and Communication Architecture

Figure 3:
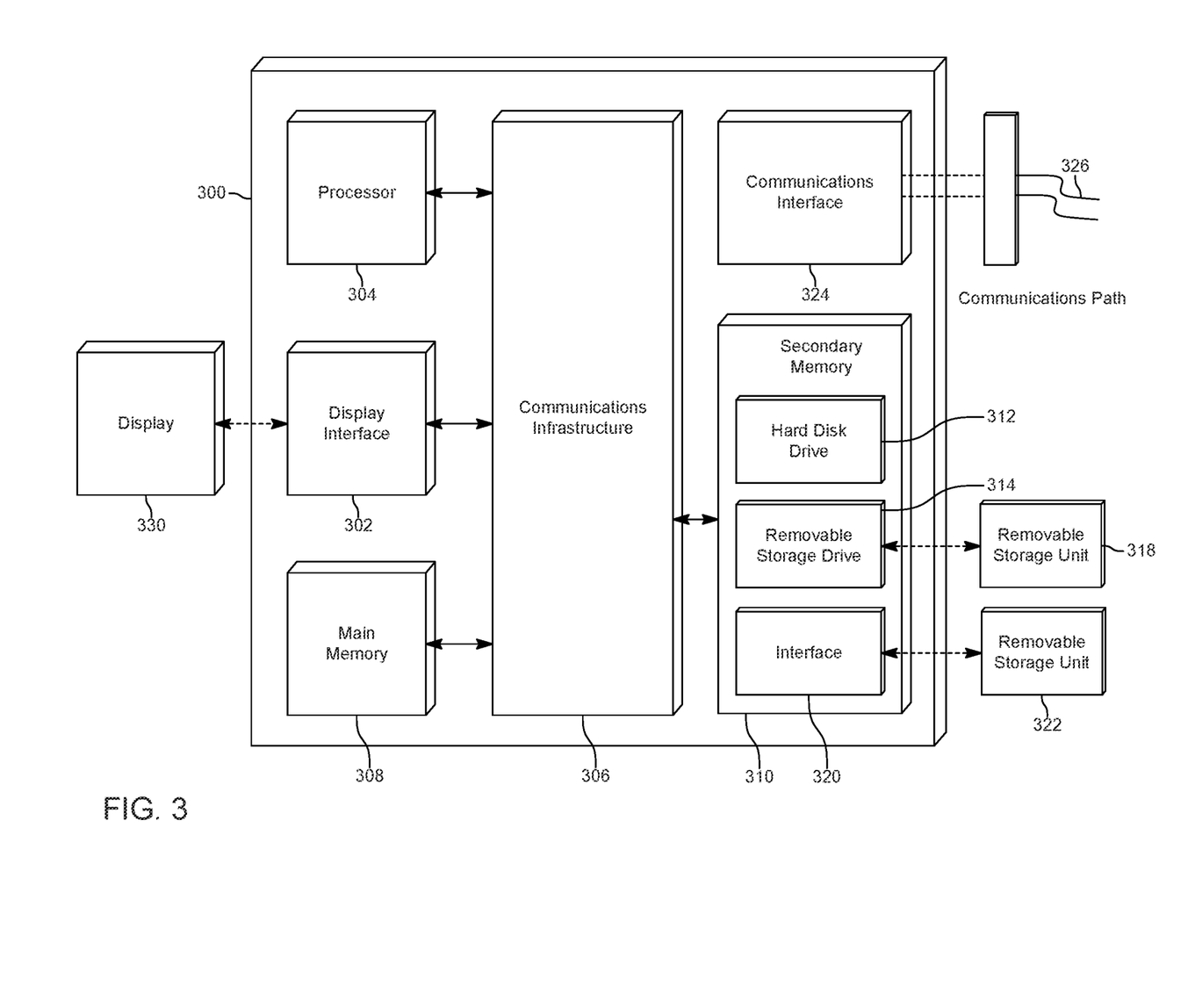
FIG. 3 illustrates a representative computer system.
Figure 4:
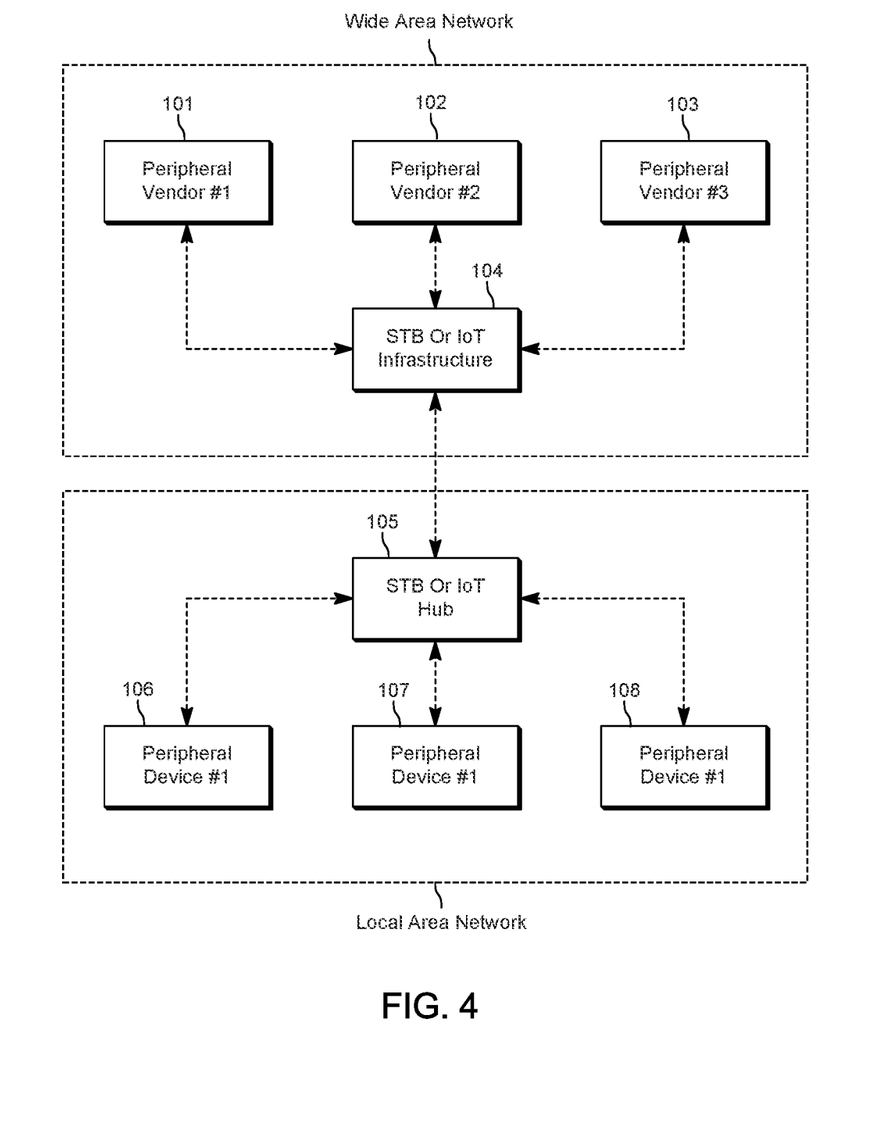
FIG. 4 is a diagram illustrating an exemplary communication architecture.

FIG. 3 illustrates a representative computer system 300 in which embodiments of the present disclosure, or portions thereof, may be implemented as computer-readable code. FIG. 4 illustrates a representative communication architecture 400 by which various components of the system may be connected. The head-end infrastructure 104, the STB or IoT hub 105, or the peripheral devices 106 to 111, of FIG. 1 may be implemented in whole or in part by a computer system 300 using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present invention.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 318, a removable storage unit 322, and a hard disk installed in hard disk drive 312.

Various embodiments of the present disclosure are described in terms of this representative computer system 300. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 304 may be a special purpose or a general purpose processor device specifically configured to perform the functions discussed herein. The processor device 304 may be connected to a communications infrastructure 306, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 300 may also include a main memory 308 (e.g., random access memory, read-only memory, etc.), and may also include a secondary memory 310. The secondary memory 310 may include the hard disk drive 312 and a removable storage drive 314, such as a floppy disk drive, a magnetic tape drive, an optical disk drive, a flash memory, etc.

The removable storage drive 314 may read from and/or write to the removable storage unit 318 in a well-known manner. The removable storage unit 318 may include a removable storage media that may be read by and written to by the removable storage drive 314. For example, if the removable storage drive 314 is a floppy disk drive or universal serial bus port, the removable storage unit 318 may be a floppy disk or portable flash drive, respectively. In one embodiment, the removable storage unit 318 may be non-transitory computer readable recording media.

In some embodiments, the secondary memory 310 may include alternative means for allowing computer programs or other instructions to be loaded into the computer system 300, for example, the removable storage unit 322 and an interface 320. Examples of such means may include a program cartridge and cartridge interface (e.g., as found in video game systems), a removable memory chip (e.g., EEPROM, PROM, etc.) and associated socket, and other removable storage units 322 and interfaces 320 as will be apparent to persons having skill in the relevant art.

Data stored in the computer system 300 (e.g., in the main memory 308 and/or the secondary memory 310) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 300 may also include a communications interface 324. The communications interface 324 may be configured to allow software and data to be transferred between the computer system 300 and external devices. Exemplary communications interfaces 324 may include a modem, a network interface (e.g., an Ethernet card), a communications port, a PCMCIA slot and card, etc. Software and data transferred via the communications interface 324 may be in the form of signals, which may be electronic, electromagnetic, optical, or other signals as will be apparent to persons having skill in the relevant art. The signals may travel via a communications path 326, which may be configured to carry the signals and may be implemented using wire, cable, fiber optics, a phone line, a cellular phone link, a radio frequency link, etc.

The computer system 300 may further include a display interface 302. The display interface 302 may be configured to allow data to be transferred between the computer system 300 and external display 330. Exemplary display interfaces 302 may include high-definition multimedia interface (HDMI), digital visual interface (DVI), video graphics array (VGA), etc. The display 330 may be any suitable type of display for displaying data transmitted via the display interface 302 of the computer system 300, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 308 and secondary memory 310, which may be memory semiconductors (e.g., DRAMs, etc.). These computer program products may be means for providing software to the computer system 300. Computer programs (e.g., computer control logic) may be stored in the main memory 308 and/or the secondary memory 310. Computer programs may also be received via the communications interface 324. Such computer programs, when executed, may enable computer system 300 to implement the present methods as discussed herein. In particular, the computer programs, when executed, may enable processor device 304 to implement the methods illustrated by FIGS. 1 and 2, as discussed herein. Accordingly, such computer programs may represent controllers of the computer system 300. Where the present disclosure is implemented using software, the software may be stored in a computer program product and loaded into the computer system 300 using the removable storage drive 314, interface 320, and hard disk drive 312, or communications interface 324.

The processor device 304 may comprise one or more modules or engines configured to perform the functions of the computer system 300. Each of the modules or engines may be implemented using hardware and, in some instances, may also utilize software, such as corresponding to program code and/or programs stored in the main memory 308 or secondary memory 310. In such instances, program code may be compiled by the processor device 304 (e.g., by a compiling module or engine) prior to execution by the hardware of the computer system 300. For example, the program code may be source code written in a programming language that is translated into a lower level language, such as assembly language or machine code, for execution by the processor device 304 and/or any additional hardware components of the computer system 300. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 300 to perform the functions disclosed herein. It will be apparent to persons having skill in the relevant art that such processes result in the computer system 300 being a specially configured computer system 300 uniquely programmed to perform the functions discussed above.

Figure 5:
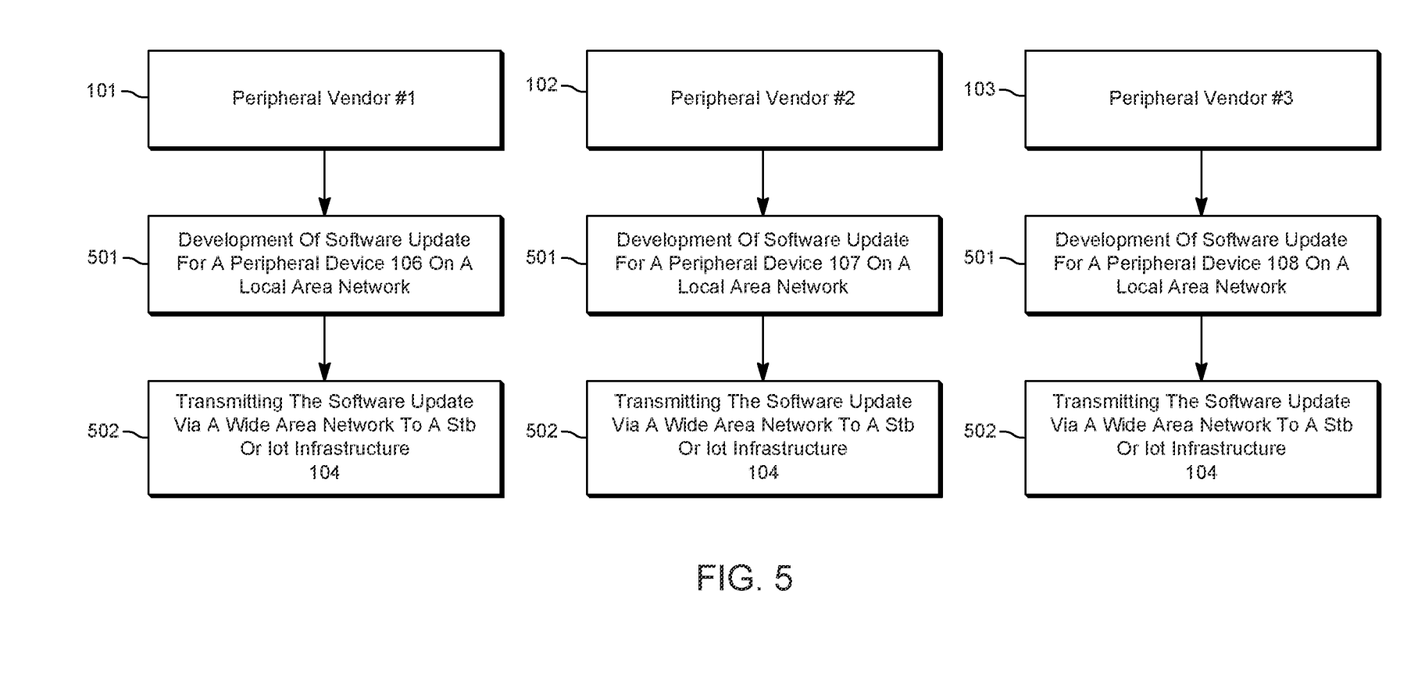
FIG. 5 is an exemplary flow diagram for operations carried out by a peripheral vendor.

FIG. 5 is an exemplary flow diagram for operations carried out by a peripheral vendor, 101. In step 501, the peripheral vendor 101 develops a software update for a peripheral device 106 that is on a Local Area Network. In step 502, the peripheral vendor 101 transmits the software update via a Wide Area Network to a STB or IoT Infrastructure 104. This process can be performed by a single peripheral vender 101 or by multiple peripheral vendors 101. For instance, multiple peripheral vendors 101 can generate software updates for multiple peripheral devices 106, each peripheral vendor 101 generating a software update for each peripheral device 106. In addition, or in the alternative, a single peripheral vendor 101 can generate software updates for multiple peripheral devices 106.

Figure 6:
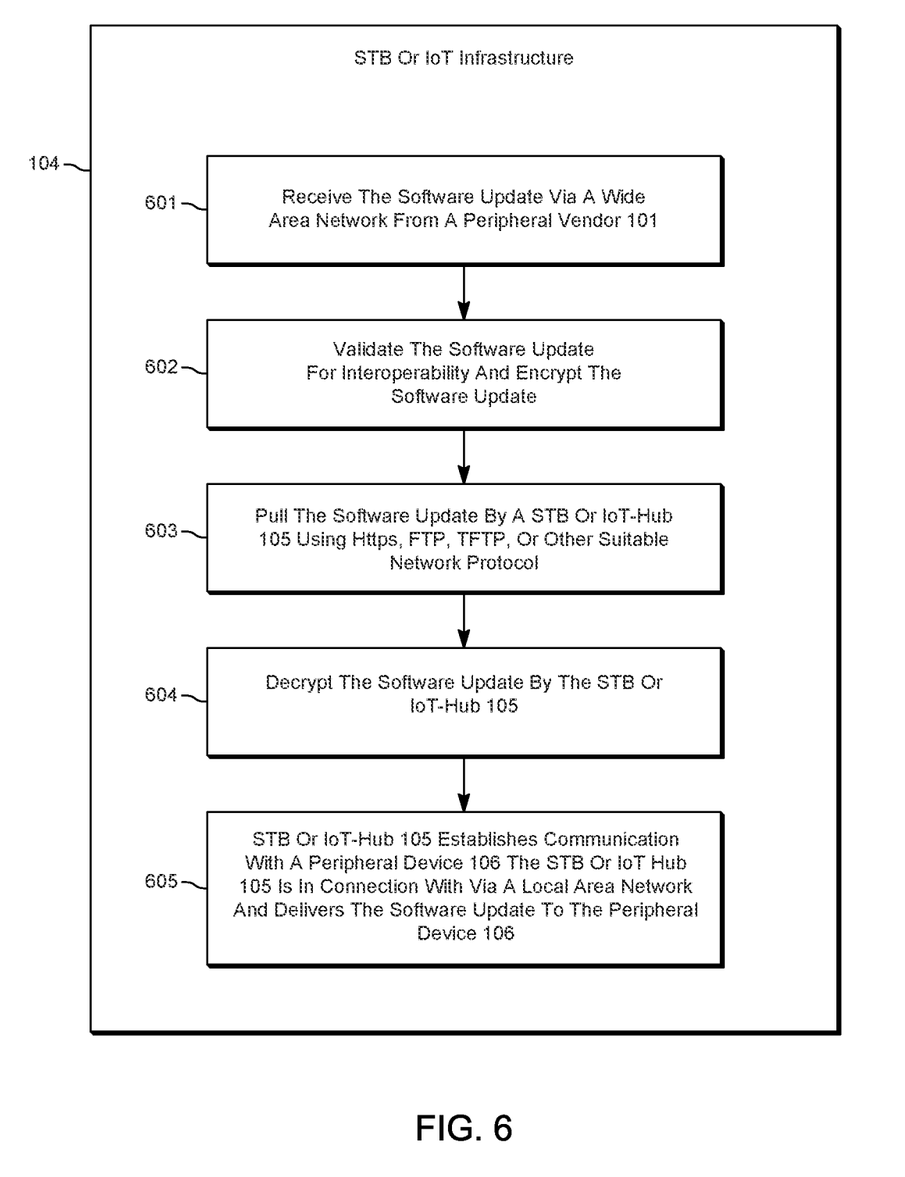
FIG. 6 is an exemplary flow diagram for operations carried out by a STB or IoT infrastructure.

FIG. 6 is an exemplary flow diagram for operations carried out by a STB or IoT infrastructure 104. In step 601, the STB or IoT infrastructure 104 receives the software update via a Wide Area Network from a peripheral vendor 101. In step 602, the STB or IoT infrastructure 104 validates the software update for interoperability and encrypts the software update. In step 603, a STB or IoT-hub 105 pulls the software update using https, FTP, TFTP, or other suitable network protocol. In step 604, the STB or IoT-hub 105 decrypts the software update. In step 605, the STB or IoT-hub 105 establishes communication with a peripheral device 106 that the STB or IoT hub 105 is in connection with via a Local Area Network and delivers the software update to the peripheral device 106. This process can be performed by a single STB or IoT infrastructure 104 or by multiple STB or IoT infrastructures 104. For instance, multiple STB or IoT infrastructures 104 can deliver the software update to multiple peripheral device(s) 106, each STB or IoT infrastructures 104 delivering a software update for each peripheral device 106. In addition, or in the alternative, a single STB or IoT infrastructure 104 can deliver the software updates for multiple peripheral devices 106.

Figure 7:
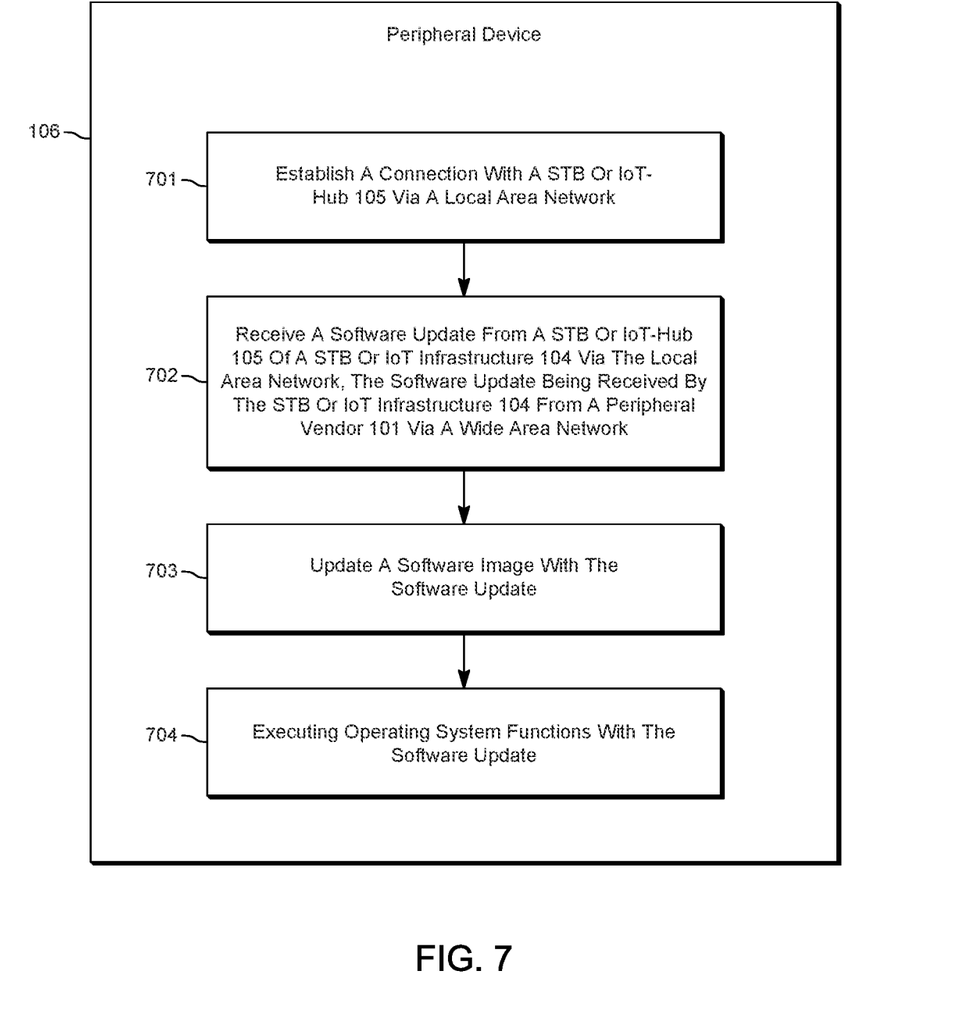
FIG. 7 is an exemplary flow diagram for operations carried out by a peripheral device.

FIG. 7 is an exemplary flow diagram for operations carried out by a peripheral device 106. In step 701, the peripheral device 106, establishes a connection with a STB or IoT-hub 105 via a Local Area Network. In step 702, the peripheral device 106 receives a software update from a STB or IoT-hub 105 of a STB or IoT Infrastructure 104 via the Local Area Network, the software update being received by the STB or IoT Infrastructure 104 from a peripheral vendor 101 via a Wide Area Network. In step 703, the peripheral device 106 updates a software image with the software update. In step 704, the peripheral device 106 executes operating system functions with the software update.

Techniques consistent with the present disclosure provide, among other features, systems and methods for updating peripheral devices connected to a STB, IoT hub, or gateway. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:
1. A method for delivering a peripheral device software update in an area network, comprising:

receiving, by a headend, a peripheral device software update from a peripheral device vendor via an area network, the peripheral device software update being configured for execution by a peripheral device on the area network;

validating, by the headend, the interoperability of the peripheral device software update with the headend of the area network;

encrypting, by the headend, the validated peripheral device software update at the headend of the area network; and delivering, by the headend, the encrypted peripheral device software update to a processor responsible for controlling an interface to the area network.

2. The method of claim 1, further comprising:

downloading, by the processor, the validated peripheral device software update;

decrypting, by the processor, the validated peripheral device software update to generate an authenticated version of the peripheral device software update; and transmitting the authenticated version of the peripheral device software update to the peripheral device.

3. The method of claim 2, further comprising:

executing the authenticated version of the peripheral device software update via the peripheral device.

4. The method of claim 1, wherein the processor includes any one or combination of a set-top box ("STB"), an Internet of things ("IoT") hub, or a gateway.

5. The method of claim 1, wherein the processor maintains a list of addresses for at least one peripheral device, the method further comprising:

comparing, by the processor, an address for the validated peripheral device software update to an address associated with the at least one peripheral device.

6. The method of claim 5, further comprising:

determining, by the processor, whether the validated peripheral device software update is addressed to a peripheral device within the list before downloading the validated peripheral device software update.

7. The method of claim 2, wherein the peripheral device cannot be directly connected to the Internet.

8. The method of claim 1, wherein the peripheral device software update is configured for execution by any one or combination of a microphone, a smart TV, an IoT sensor, a remote control unit, a game controller, or a sound bar.

9. The method of claim 2, wherein the peripheral device is connected to the area network via any one or combination of a wireless connection or a wired connection.

10. An apparatus for delivering a peripheral device software update in an area network, comprising:

a processor responsible for controlling an interface to an area network;

a headend infrastructure configured to:

receive a peripheral device software update from a peripheral device vendor via the area network, the peripheral device software update being configured for execution by a peripheral device on the area network;

validate the interoperability of the peripheral device software update with the headend infrastructure; and encrypt the validated peripheral device software update and deliver the encrypted software update to the processor.

11. The apparatus of claim 10, wherein the processor is configured to:

download the validated peripheral device software update;

decrypt the validated peripheral device software update to generate an authenticated version of the peripheral device software update; and transmit the authenticated version of the peripheral device software update to the peripheral device.

12. The apparatus of claim 11, further comprising:

the peripheral device configured to execute the authenticated version of the peripheral device software update.

13. The apparatus of claim 10, wherein the processor includes any one or combination of a set-top box ("STB"), an Internet of things ("IoT") hub, or a gateway.

14. The apparatus of claim 10, wherein the processor maintains a list of addresses for at least one peripheral device is configured to compare an address for the validated peripheral device software update to an address associated with the at least one peripheral device.

15. The apparatus of claim 14, wherein processor is configured to determine whether the validated peripheral device software update is addressed to a peripheral device within the list before downloading the validated peripheral device software update.

16. The apparatus of claim 11, wherein the peripheral device cannot be directly connected to the Internet.

17. The apparatus of claim 10, wherein the peripheral device software update is configured for execution by any one or combination of a microphone, a smart TV, an IoT sensor, a remote control unit, a game controller, or a sound bar.

18. The apparatus of claim 11, wherein the peripheral device is connected to the area network via a wireless connection.

19. The apparatus of claim 11, wherein the peripheral device is connected to the area network via a wired connection.

20. A non-transitory computer readable medium containing program instructions for delivering a peripheral device software update in an area network, wherein execution of the program instructions by one or more processors of a computer system causes the one or more processors to:

receive a peripheral device software update from a peripheral device vendor via the area network, the peripheral device software update being configured for execution by a peripheral device on the area network;

validate the interoperability of the peripheral device software update with a headend of the area network; and encrypt the validated peripheral device software update at the headend of the area network and deliver the encrypted peripheral device software update to a processor responsible for controlling an interface to the area network, the processor responsible for controlling the interface being configured to download and decrypt the validated peripheral device software update and generate an authenticated version of the peripheral device software update.

\* \* \* \* \*